Oct. 6, 1959 G. H. DEWITZ 2,907,957

ELECTRICALLY VARIABLE DELAY LINE

Filed Dec. 31, 1952 3 Sheets-Sheet 1

INVENTOR
GERHARD H. DEWITZ
BY
Curtis, Morris & Safford.
ATTORNEYS

INVENTOR
GERHARD H. DEWITZ
BY
Curtis, Morris & Safford
ATTORNEYS

Oct. 6, 1959 G. H. DEWITZ 2,907,957

ELECTRICALLY VARIABLE DELAY LINE

Filed Dec. 31, 1952 3 Sheets-Sheet 3

INVENTOR
GERHARD H. DEWITZ
BY
Curtis, Morris & Safford
ATTORNEYS

United States Patent Office 2,907,957

Patented Oct. 6, 1959

2,907,957

ELECTRICALLY VARIABLE DELAY LINE

Gerhard H. Dewitz, Westport, Conn., assignor to C.G.S. Laboratories, Inc., Stamford, Conn., a corporation of Connecticut Application December 31, 1952, Serial No. 329,026

8 Claims. (Cl. 333—29)

This invention is in the field of time delay lines for use in electric circuits, and it is particularly useful in systems in which the amount of delay is varied.

An electrical delay line is often in the form of a circuit having a pair of input terminals and a pair of output terminals and arranged so that a significant period of time, called its delay time, is required for signals to pass through the circuit from the input to the output terminals. Such delay lines are used in measuring, computing, communication, and other circuits.

One of the problems of the various known electrical delay lines is that they provide fixed delay times which can be changed only by means of mechanical switching, adding additional elements, and similar awkward expedients.

An aspect of the present invention provides a delay line having a continuously variable delay time extending over a significant range of time and which may be controlled from a remote location.

Still another aspect of the present invention relates to the provision of a controllable impedance termination arrangement at the ends of the delay line, whereby the impedance of the termination or terminations is continually matched to the surge impedance of the line irrespective of changes in the time delay or impedance of the line.

One feature of the invention provides the advantage that the surge impedance of the delay line can be maintained at a fixed value even though the delay time is changed.

An object of this invention is the provision of a delay line in which the series and the shunt elements thereof may be individually or collectively controllable to produce a variety of different operating characteristics as may be desired under different conditions of service and operable over a wide range of frequencies.

Still another aspect of this invention relates to delay lines wherein the delay time is rapidly variable.

It is another object of my invention to provide an electrically controllable delay line having a relatively wide range in delay times.

These and other objects, aspects, and advantages of my invention will be in part pointed out and in part apparent from the following description taken in junction with the accompanying drawings, in which.

Figure 1:
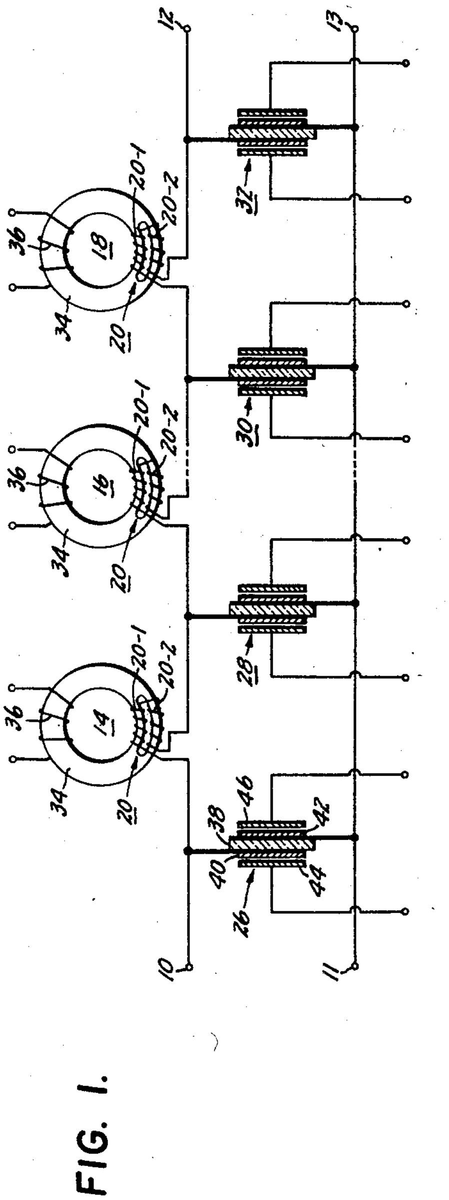
Figure 1 is a diagrammatic circuit of a controllable delay line embodying the present invention.

A delay line usually comprises a number of lumped inductive elements connected in series with the line and a number of lumped capacitive elements each connected across the line between adjacent inductive elements. Figure 1 shows such a delay line. The signal to be delayed is applied between two input terminals at 10 and 11 and travels along the line toward the right to arrive, after a controlled period of time, at the output terminals 12 and 13. The circuit between terminals 10 and 12 includes any desired number of serially-connected controllable inductors, only three of which are illustrated at 14, 16 and 18, each of which includes a winding 20 which is divided into two equal parts as indicated at 20—1 and 20—2.

Four continuously variable shunt capacitance elements, generally indicated at 26, 28, 30 and 32 are connected across the line between the inductors 14, 16, and 18, as shown. Any desired number of capacitive and inductive elements and various arrangements thereof can be used in the line to provide the desired characteristics, as is well understood by those familiar with this art.

Because the inductors 14, 16, and 18 are of identical construction, only the inductor 14 will be described. This inductor includes a core 34 composed of a ferromagnetic ceramic material, for example, such as is described by Snoek in U.S. Patents 2,452,529; 2,452,530; and 2,452,531. Such material has a relatively high initial permeability and a relatively low saturation flux density. These two characteristics make it well suited for use as a magnetic core material, for instance, for use in a controllable inductor as shown. In addition, this material, when used as a magnetic core, exhibits the characteristic that its incremental permeability is decreased markedly when the material is subjected to a strong magnetic field. That is, when the coil is wound on such a ferromagnetic ceramic core, the apparent reactance of the coil to the flow of a low-amplitude alternating current signal is decreased markedly if the core is simultaneously subjected to a relatively strong auxiliary magnetic field, for example, such as that created by direct current flowing through a bias winding on the core. With no D.C. bias field, the material exhibits a certain permeability to the A.C. field. As the bias field is increased from zero, the incremental permeability to the A.C. field decreases rapidly from a maximum to a low value, and as the bias field is further increased, the core material becomes more saturated and the in cremental permeability decreases at a reduced rate to a minimum.

Figure 3:
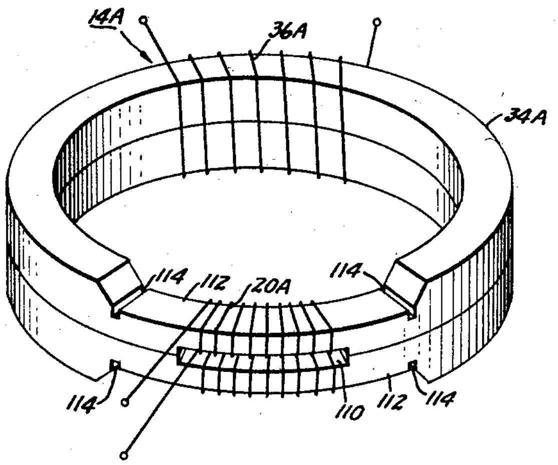
Figure 3 is a perspective view of a variable inductor such as may be used in the delay lines of Figures 1 or 2.

In order to provide a D.C. bias magnetic field, the inductor core 34 in Figure 3 carries a bias winding 36. The presence of a D.C. current in this winding 36 produces a bias magnetic field throughout the core. This bias field affects the incremental permeability of the core 34 so that the inductive reactance of the winding 20 in the delay line can be controlled by varying the current through the bias winding 36.

In order to minimize the coupling between the control or bias winding 36 and the inductive winding 20, the latter winding is divided into two equal parts 20—1 and 20—2, which are wound in opposite directions on separate portions of the core so that any voltages induced in the windings 20—1 and 20—2 by changes in the flux induced in the core 34 by the bias winding 36 will be equal and opposing so that no signal will be induced into the delay line.

Alternatively, the interaction can be minimized by forming the bias winding 36 of two equal and oppositely wound portions while using a continuously wound coil for winding 20.

In order to establish the bias magnetic field, the control winding 36 is connected to an adjustable source of direct current (not shown).

It is apparent that what has been said about inductor 14 applies to the other inductors forming this artificial delay line. With this arrangement, the current through the bias windings 36 of these inductors can be varied simultaneously, thereby, varying the reactance of windings 20 and accordingly changing the delay characteristics of the line. Although only three inductors 14, 16, and 18 and four capacitors 26, 28, 30, and 32 are shown, it is well known in the art that a delay line may include any desired number and arrangement of inductors and capacitors.

Thus, variation in the exciting current through the control windings 36 of the inductors 14, 16, and 18, respectively, will cause a change in the time required for a pulse of electrical energy to traverse the line from the input terminals 10 and 11 to the output terminals 12 and 13, but it will also cause a change in the characteristic or surge impedance of the line. Accordingly, the capacitors 26, 28, 30, and 32 are arranged so as to be variable simultaneously with the inductive reactance of the line. Because the characteristic impedance of the line is a function of the product of the individual capacitance values and the individual inductance values, this simultaneous variation can be accomplished in such manner as to vary the delay time of the line while maintaining the characteristic impedance substantially constant.

The capacitors 26, 28, 30, and 32 are identical except that capacitors 26 and 32 at the ends of the line may have one-half the capacity of the others, therefore, only capacitor 26 will be described in detail. In order to provide the variable capacity without the need for mechanically moving parts, ceramic dielectric material is utilized which exhibits the characteristic of an increasing dielectric constant with increase in the electrostatic field gradient present within the material. For example, a dielectric ceramic including barium titanate and strontium titanate or the like, exhibits such a characteristic. Thus, in capacitor 26, such dielectric ceramic material 38 is positioned between two condenser plates 40 and 42, connected across the line as shown. Two bias plates 44 and 46 are positioned on opposite sides of the dielectric 38 perpendicularly to the condenser plates 40 and 42, similar to the arrangement shown in Figure 6, the drawing of Figure 1 being diagrammatic to show the circuit arrangement more clearly. A high voltage is applied between the bias plates 44 and 46 and variation in this voltage causes a corresponding variation in the capacitance between the condenser plates 40 and 42. In this diagrammatic illustration, the bias field would be parallel with the capacitive field; however, the bias plates 44 and 46 may be positioned, in actual construction, so that the electrostatic bias field in the ceramic dielectric material 38 is perpendicular or at an angle with respect to the capacitive field as will be explained below. In some instances, the same plates may serve as both the bias and capacitance plates.

As is well known in the art, the delay time of an artificial line, that is, the length of time for an electrical impulse to travel from the input terminals 10 and 11 to the output terminals 12 and 13 of a delay line, such as is schematically represented in Figure 3, is proportional to the square root of the product of the inductance and capacitance of the elements when they are adjusted so that all of the inductances are of the same magnitude and all of the capacitances are of the same magnitude, except that the values of capacitances across the input and output circuits may be equal to one-half the values of the other capacitors, as is well known in this art.

In other words, expressed mathematically and neglecting certain losses that are not important here, the delay time "T" is:

$$T=\sqrt{LC} \qquad (1)$$

where "L" represents the inductance of an inductor in the delay line and "C" the capacitance of one of the full-valve capacitors along the line.

A variation in incremental inductance of each of the inductors 14, 16, and 18 through a range of at least nine to one can be obtained by varying the bias field applied to the inductor. A similar range of variation can be obtained in each of the capacitances 26, 28, 30, and 32 by varying the electrostatic bias field applied thereto as explained above.

Assuming that the inductance and the capacitance of the inductors and capacitors in a delay line, such as is shown in Figure 3, are each changed through a range of nine to one, it is seen, from Equation 1 above, that the delay time, "T," is also changed by a ratio of nine to one. Since the characteristic impedance "Z" of such a line (again neglecting certain losses not important here) is:

$$Z=\sqrt{\frac{L}{C}} \qquad (2)$$

the impedance of the line will remain constant provided "L" and "C" are varied proportionately.

As shown by Equation 1, the delay time can be changed over a range of three to one by varying either the inductance or the capacitance over a nine to one range. However, when only one of these factors is changed, the characteristic impedance of the line is changed, as can be seen from the Expression 2. For instance, if "C" be held constant and "L" be changed through a range of nine to one, the impedance of the line will change through a range of three to one. Such a variation in impedance may introduce losses and disturb the matching or coupling characteristics of the system.

These difficulties can be overcome to considerable extent by simultaneously changing the impedance in which the line is terminated so that it always matches the changing impedance of the line. Such an arrangement will be described in connection with the system shown in Figure 2.

It is desirable that the variable inductance and the capacitance elements normally be pre-biased to have values near the mid-point of the range of variations available, thus yielding a greater flexibility in control, since the reactance can then be varied in either direction. For instance, it is possible to bias the inductors during operation so that they normally are at the mid-point of their range of change in incremental permeability, that is, a sufficient bias field is normally applied to produce a certain incremental permeability, which can be varied above and below this point by an additional positive or negative bias or control current. Such a mid-range bias can be obtained by the use of a bias current of proper magnitude in the windings 36, or by using permanently magnetized material as part of or in connection with the core structures. Such an arrangement will be discussed later.

An electrostatic bias can be achieved in a capacitor element by imposing a D.C. bias voltage on the bias plates, or by including in the capacitor dielectric a permanently electrostatically polarized material or electret such as is described by Southworth in U.S. Patent No. 2,460,109.

Figure 2:
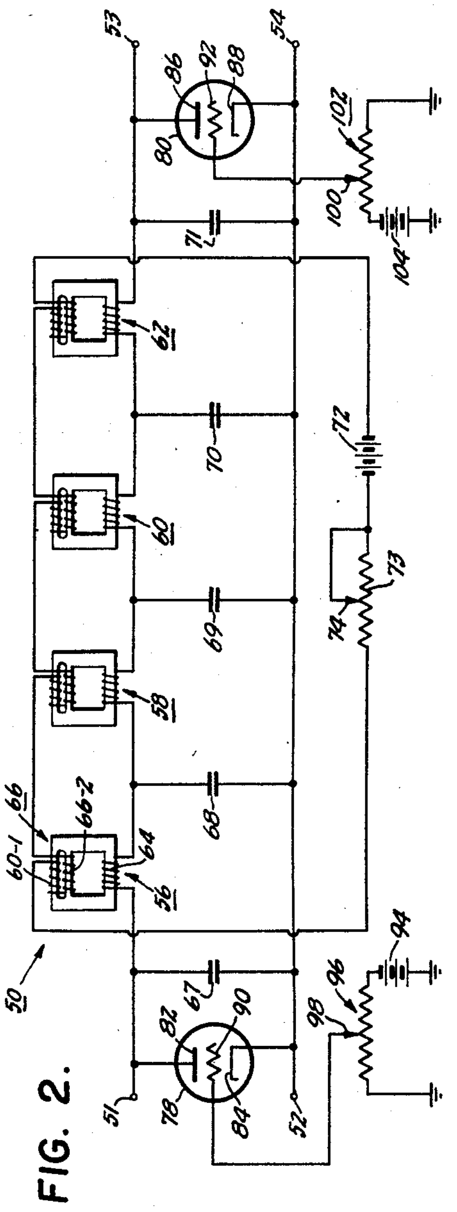
Figure 2 is a diagrammatic representation of a delay line system according to the present invention.

Figure 2 shows, diagrammatically, a delay line, generally indicated at 50, embodying the invention. This line includes a pair of input terminals 51 and 52 and a pair of output terminals 53 and 54 and includes serially-connected inductors, indicated generally at 56, 58, 60, and 62, each of which may be of the same general type as the inductors described in connection with Figure 1. The single winding of each inductor, for example, such as the winding 64 of the inductor 56 may be used as the inductance winding and a control winding 66 divided into two oppositely wound bias or control winding portions 66—1 and 66—2 which are connected in series in such direction as to cancel out any voltage induced therein by the inductance winding, is used to control the inductance of the winding 64.

Conventional type capacitors 68, 70, 72, 74, and 76 are connected across the delay line between the respective inductance elements.

In order to control the time delay of the line 50, a source of control current 72 is connected in series with the control windings 66 of each of the inductors 56, 58, 60, and 62, through a variable current control resistor 73 having a movable contact 74 slidable therealong. The adjustment of the contact 74 may be manual or automatic, depending on the application for which the line 50 is used, thus providing manual or automatic control of the length of the delay time.

Because the delay line 50 has its delay time controlled by varying the inductance of the inductors 56, 58, 60, and 62 without proportionately changing the capacitance of the line condensers, the characteristic impedance of the delay line will vary, in a manner as explained above.

In order to reduce reflection losses in the line, a termination is provided for the delay line 50 having an impedance which can be varied to match the varying impedance of the line. This variable impedance is produced by a triode vacuum tube 78 connected between the input terminals of the delay line, and a second triode vacuum tube 80 is connected between the output terminals of the line.

The anode 82 of the vacuum tube 73 is connected to one input terminal 51 of the line and its cathode 84 is connected to the other input terminal 52. Likewise, the anode 86 of the tube 80 is connected to one of the output terminals 53 of the line 50 and its cathode 88 is connected to the other output terminal 54.

It is thus seen that the delay-line terminals look into the plate-to-cathode impedance of the triodes 78 and 80. In order to vary the plate-to-cathode impedance of these tubes so that this impedance is maintained substantially commensurate with the characteristic impedance of the delay line 50, a variable bias is impressed on their control grids 90, and 92 in time relationship with the variable bias current fed to the bias windings of the inductors 56, 58, 60, and 62. The variable bias for the control grid 90 of the tube 78 may be supplied from any controllable source of direct voltage, such as by a battery 94 and a potentiometer 96, having a sliding contact 98 connected to the grid 90. Similarly, the grid 92 is connected to the sliding contact 100 of the potentiometer 102, which in turn is connected to the negative terminal of a battery 104. The potentiometers 96 and 102 allow the grid bias on tubes 78 and 80 to be adjusted to obtain the desired value in plate-to-cathode impedance. This adjustment may be manually performed, or the sliding contacts 98 and 100 can be ganged together and connected to the sliding contact 74 of the bias current control resistor 73 so that the delay time and impedance termination are both automatically controlled.

A preferred form of variable inductor suitable for use in the delay lines shown in Figures 1 or 2 is generally indicated at 14A in Figure 3 having an annular core 34A composed of a ceramic ferromagnetic material, one portion of which is slotted as shown at 110. A bias winding 36A is wound around an un-slotted portion of the core 34A, and each half of the signal winding 20A is wound around one-half of the cross-section of the core 34A as shown. Such an annular core has several operating advantages, for example, compactness, high efficiency, and improved temperature response characteristics.

In order to further reduce the required control and bias power in winding 36A for changing the inductive reactance of signal winding 20A, the cross sectional area of the core 34A is reduced by notches as at 112. These notches extend over a larger sector of the core 34A than the slot 110 separating the sections of winding 14A. This slot is made just large enough to accommodate the desired winding, and on either side thereof are formed small slots 114 which reduce the cross sectional area of the core by an additional amount. These slots produce a restricted cross section in the core 34A which is saturated to a higher degree than the lesser saturated area of the notches 112 and the still-lesser saturated area of the remainder of the core 34A. These pre-saturation notches 114 thus cause, in the presence of bias current in winding 36A, a cross sectional area of lower permeability than elsewhere, which restricts the flux-lines produced by the signal current in the signal winding 14A to the area of the notches 112.

This in effect reduces the losses of energy of the signal current which are inherent to the magnetic material of the core. These losses become smaller with increased field strength in the ceramic material referred to herein and the pre-saturation slots prevent the spreading of signal current flux into the area of higher permeability and higher losses.

The grooves at 112 result also in a faster decrease of the permeability in that area than in the thicker part of the core 34A, which reduces the required power in the winding 36A for a specific change of inductance. Furthermore, the grooves result in a substantial linearization of the inductance versus bias current curve.

Figure 3 actually shows two annular rings fitted together along one surface. This does not change the described performance but simplifies the production of these ceramic cores.

Figure 4:
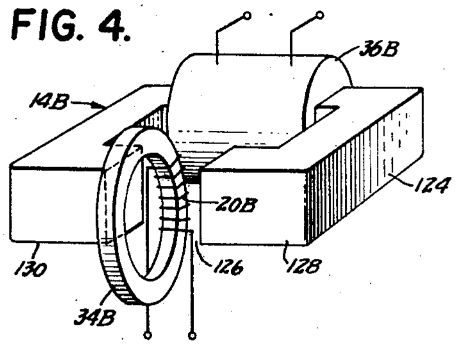
Figure 4 is a diagrammatic perspective view of another variable inductor which may be used in these delay lines.

Figure 4 shows diagrammatically an alternate form of an inductor, generally indicated at 14B, such as can be used in the delay line of Figure 1. The core 124 of this inductor is composed of any suitable magnetic material such as soft iron and is of a generally rectangular form having a gap 126 defined by opposing faces of a pair of pole pieces 128 and 130. The bias winding 36B is wound around a portion of the core 124 opposite the gap 126. When a bias current is impressed upon the terminals of the bias winding 36B a magnetic field is created throughout the body of the core 124 and this bias field passes through the gap 126. With this construction, the density of the bias field existing in the gap 126 can be regulated or controlled by varying the bias current flowing through the winding 36B. Within the gap 126 is located a core 34B of a ferromagnetic ceramic material which has a relatively high magnetic permeability compared with air, around which is wound the inductive winding 20B. The flux existing in the gap 126 passes through the core 34B creating a bias magnetic field within the body of the core. The direction of the bias field in the gap extends substantially parallel and between the pole pieces 128 and 130, and the direction of the bias field created in the core 34B will be substantially all in the same direction. Because the axis of winding 20B is substantially perpendicular to the direction of the magnetic bias field extending across the gap 126, there is, therefore, a minimum of magnetic flux which is mutual to these two fields and, consequently, the interaction between the bias winding 36B and the inductive winding 20B is minimized.

In practice, the gap 126 is completely filled with magnetic material. For example, iron powder may be mixed with a thermosetting plastic material to form a paste which is then pressed into the gap 126. The plastic is then hardened in the usual manner. It is advantageous also to apply the magnetic field to the gap before the plastic is hardened and to maintain this field during the curing process. This orients the magnetic particles and produces a lower magnetic reluctance in the desired direction while restraining undesired eddy currents along other paths.

As explained above, changing the magnitude of the bias current in the bias winding 36B changes the density of the bias field existing in the gap 126, and accordingly changes the inductance presented by the inductive coil 20B.

Figure 5:
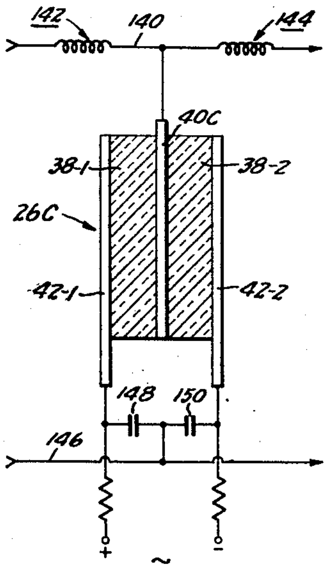
Figure 5 is a diagrammatic view of a condenser, the capacity of which may be varied by changing the magnitude of an applied controllable potential and which may be used in the delay line of Figure 1.

An electrically controllable capacitor, generally indicated at 26C in Figure 5, is suitable for use in the variable delay lines, such as shown in Figures 1 and 2. One conductor 140 of the delay line between inductance devices schematically shown at 142 and 144 is connected to a conductive plate 40C positioned between two sheets 38—1 and 38—2 of dielectric material, such as described in connection with Figure 1. The other conductor 146 of the delay line is connected through two fixed condensers 148 and 150, respectively, to condenser plates 42—1 and 42—2 positioned adjacent the outer surfaces of dielectric sheets 38—1 and 38—2. A D.C. bias or control voltage is applied between plates 42—1 and 42—2 to control the capacity between the two lines 140 and 146 of the delay line.

Figure 6:
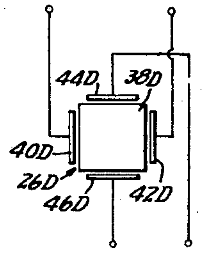
Figure 6 is a cross sectional view of another electrical variable capacitor such as may be used in the delay line of Figure 1.

A capacitor, generally indicated at 26D in Figure 6, also is suitable for use in these delay lines. The capacitive plates 40D and 42D are located on opposite sides of a block 38D of ceramic dielectric material of the nature discussed above. On two other opposite sides of this block are located the bias plates 44D and 46D. It is seen that the imposition of a bias voltage upon these plates 44D and 46D creates an electrostatic stress or field throughout the body of dielectric 38D, which regulates or controls the dielectric constant of the dielectric material 38D thereby controlling the capacitance existing between the capacitance plates 40D and 42D as discussed above.

Figure 7:
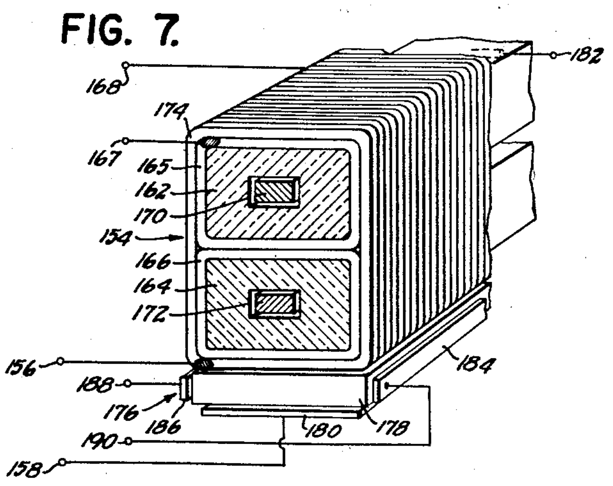
Figure 7 is a cross sectional and partial perspective view of a variable delay line.

An alternate form of delay line is indicated generally at 154 in Figure 7 having input terminals 156 and 158. In this embodiment, the delay line is constructed with distributed constants, whereas the delay line shown in Figures 1 and 2 are of the type having so-called "lumped" elements, that is, having individual discreet inductors and capacitors.

Thus, in Figure 7 the inductors and capacitors are all included in one integrated structure. The inductor part of this delay line comprises first and second core portions 162 and 164. These portions of the core are composed of a ferromagnetic ceramic material, as discussed above in connection with the Snoek patents. In order to provide a bias magnetic field in these core portions 162 and 164, bias windings 165 and 166 are wound therearound. These windings are wound in opposite senses around the core portions 162 and 164 so that the bias fields established therein are in opposite directions. A pair of permanent bar magnets 170 and 172 may be positioned longitudinally through the centers of the cores 162 and 164 for the purpose of establishing a permanent magnetic bias for biasing these cores approximately at the mid-point of their permeability ranges, for the reasons explained above. The windings 165 and 166 are connected in series opposition between a pair of control terminals 167 and 168 so that the directions of the bias fields established in these core portions are also in opposite directions.

Wound around both of these core portions 162 and 164 and their windings 165 and 166 is an inductive winding 174 connected to one of the input terminals 156. A distributed capacitor, generally indicated at 176, is positioned adjacent one side of the winding 174, but such capacitors may be positioned adjacent two or more sides if desired. The capacitor 176 is provided with a core or block 178 of a dielectric ceramic material such as is mentioned above, and a capacitive plate 180 connected to the other input terminal 158 is positioned opposite the winding 174. The other plate of this condenser is formed by exposed portions of the turns of the winding 174 that are adjacent the dielectric block 178. In operation an electrical impulse is introduced into the delay line through the input terminals 156 and 158 between the condenser plate 180 and one end of the inductance winding 174 and after an interval sufficient for the impulses to traverse the line it appears between the other end 182 of winding 174 and the plate 180.

By varying the amount of bias current flowing through the bias windings 165 and 166, the inductance of the winding 174 is changed, thus varying the delay time of the artificial line.

Two plates 184 and 186 are provided on opposite sides of the dielectric block 178 to control the capacitance of the line. A bias voltage applied through a pair of control terminals 188 and 190 to these plates produces a transverse electrostatic field in the dielectric material so that the capacitance of the condenser 176 can be varied by changing the bias voltage applied to plates 184 and 186. A similar effect could be obtained by applying the bias voltage between the windings of coil 174 and the plate 180, however, this arrangement has the disadvantage of inducing bias voltages into the signal circuit. Thus, either or both the inductance or capacitance can be changed to vary the delay time of this distributed delay line.

Figure 8:
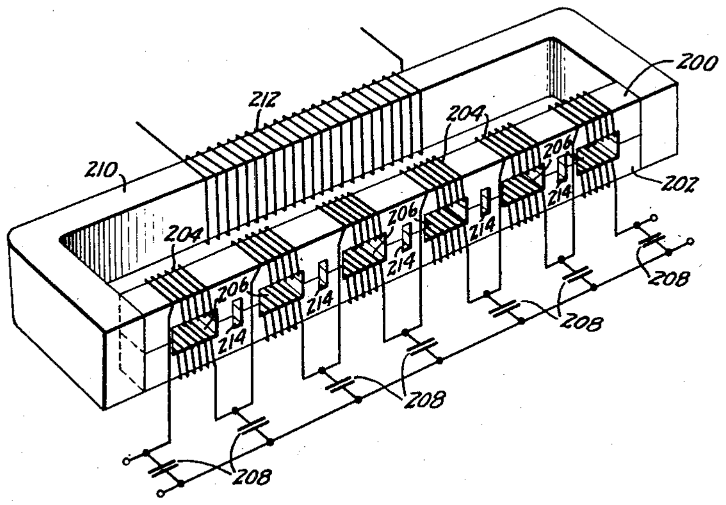
Figure 8 is a perspective and diagrammatic view of another form of delay line.

Another form of a delay line with lumped elements suitable for use in the foregoing systems is shown in Figure 8. Here two rods 200 and 202 of ferromagnetic ceramic material are joined along one surface to form a continuous length of core for the line. The variable inductances of the delay line are shown at 204 wound in two sections of opposing sense around the portions of the respective core rods 200 and 202 adjacent spaced slots 206. The capacitors of the delay line are shown at 208. A bias field is produced by a yoke structure 210 around which is placed an energizing winding 212. A current in winding 212 will create a bias field in the core 200—202, thus reducing the permeability of the material and therefore the inductance of all of the windings 204 thereon. No voltage is induced into the delay line by the control current, since the magnetic flux produced by the signal current in the windings 204 follows a closed loop around each slot.

In order to reduce coupling between the adjacent signal windings 204, transverse slots 214 are provided between the windings which cause presaturation by a small area between the windings.

Figure 9:
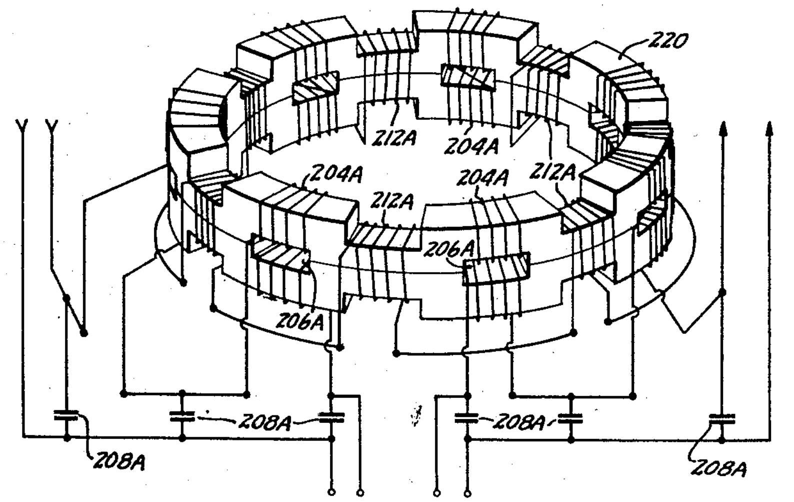
Figure 9 is a similar view of still another delay line.

Still another type of delay line is shown in Figure 9, in which the magnetic core 220 is annular. Again slots 206A are provided for the signal windings 204A which are formed in two sections as described above. All of the signal windings 204A are connected in series except for the two end inductors of the line. All of the bias winding sections 212A are also connected in series, except for the end inductors. These bias winding sections are wound into notches provided between the slotted areas of the core. The notches function as pre-saturation areas similar to the notches or transverse slots described in connection with previous figures. Some delay time types requires a certain amount of mutual coupling between the lumped signal inductances. The structures shown in Figures 8 and 9 are especially useful for such delay lines.

This application is a continuation-in-part of the prior copending application Serial No. 213,548, filed March 2, 1951.

I claim:

1. A controllable time delay system comprising an artificial transmission line having inductive means, input and output circuits, means connecting said inductive means to form a first branch of the transmission line, circuit means connected between said input and output circuits to form a second branch of the transmission line, and a plurality of capacitive elements connected between spaced points on said inductive means and said second branch of the transmission line, a magnetizable ceramic core positioned at least partially within said inductive means, magnetic field generating means arranged to produce D.C. magnetic control flux in said core, said control flux within said core being at a substantial angle to the direction of flux therein produced by said inductive means, and adjustable means arranged to control the intensity of said control flux in said core, thereby to vary the delay characteristics of said line.

2. A time delay network comprising an artificial transmission line whose time delay is controllable, said network comprising input and output circuits, an inductance circuit including a plurality of turns connected in series between said input and output circuits, a plurality of capacitance elements connected between spaced points on said inductance circuit, a magnetizable ferromagnetic core positioned within a plurality of said turns, a control winding on said core arranged to produce a D.C. magnetic control flux in said core in response to a control current in said winding, control current adjusting means arranged to regulate the intensity of said control flux, thereby to vary the delay characteristics of said line, and variable impedance means connected to said input and output circuits and responsive to said adjusting means to control the impedance match at said input and output circuits as a function of the delay characteristics of said line.

3. A controllable time delay system for delaying electrical signals comprising input and output circuits, an inductive winding including a plurality of turns connected in series between said input and output circuits, to form a first part of said system, circuit means connecting said input and output circuits together to form a second part of said system, a plurality of capacitance elements connected between spaced points on said inductive winding and the second part of said system, a magnetizable core structure having a substantially closed magnetic control flux path therethrough, said core structure having an opening therein with a closed signal flux path therearound intersecting said control flux path at a substantial angle, at least a portion of said signal flux path lying within a portion of said winding, a control winding around the control flux path of said core structure and arranged to regulate the control flux in said control path in response to a control current through said control winding, and adjustable means arranged to vary the current through said control winding, thereby to vary the delay characteristics of said network.

4. A controllable time delay system comprising an artificial transmission line having inductance means, input and output circuits, means connecting said inductance means in series between said input and output circuits to form a first branch of the transmission line, circuit means between said input and output circuits to form a second branch of the transmission line, and a plurality of capacitance circuits shunted between spaced points on said inductance means and said second branch of the transmission line, each of said capacitance circuits including first, second, and third electrodes, said second electrode being between said first and third electrode, dielectric material between said first and second electrodes and between said second and third electrodes, said dielectric material being of a type whose dielectric constant is a function of a voltage field therein, said second electrode being coupled to one of said branches and capacitance means coupling said first and third electrodes to the other of said branches, voltage field generating means connected across said first and third electrodes to vary the capacitance of each of said capacitance circuits, first adjustable means arranged to regulate the intensity of the voltage field in said dielectric material, magnetizable ferromagnetic core means positioned at least partially within said inductance means, control winding means arranged to produce D.C. magnetic control flux in said core means, and second adjustable means arranged to regulate the intensity of said flux in said core means, thereby to vary the delay characteristics and control the impedance of said line.

5. A time delay network comprising an artificial transmission line whose time delay is controllable, said network comprising input and output circuits, and inductance circuit including a plurality of turns connected in series between said input and output circuits, a plurality of capacitance elements connected between spaced points on said inductance circuit, magnetizable ferromagnetic core means positioned within a plurality of said turns, control winding means on said core means arranged to produce a D.C. magnetic control flux in said core means in response to control current, control current adjusting means arranged to regulate the intensity of said control flux, thereby to vary the delay characteristics of said line, and a pair of controllable-impedance vacuum tubes connected across said input and output circuits, respectively, and responsive to said adjusting means to control the impedance match at said input and output circuits as a function of the delay characteristics of said line.

6. A time-delay network as claimed in claim 5 and wherein said vacuum tubes are triodes each having cathode and anode electrodes coupled respectively to said input and output circuits, said triodes having grid control circuits responsive to said adjusting means.

7. A controllable time delay system for delaying electrical signals comprising input and output circuits, an inductive winding including a plurality of turns connected in series between said input and output circuits to form a first part of said system, circuit means connecting said input and output circuits together to form a second part of said system, a plurality of capacitance elements connected between spaced points on said inductive winding and the second part of said system, a magnetizable core structure having a substantially closed magnetic control flux path therethrough, said core structure having an opening therein with a closed signal flux path therearound intersecting said control flux path substantially perpendicular thereto, at least a portion of said signal flux path lying within a portion of said winding, a control winding around the control flux path of said core structure and arranged to regulate the control flux in said control path in response to a control current through said control winding, and adjustable means arranged to vary the current through said control winding, thereby to vary the delay characteristics of said network.

8. A controllable time-delay system comprising an artificial transmission line having inductance means; input and output circuits; means connecting said inductance means in series between said input and output circuits to form a first branch of the transmission line; circuit means between said input and output circuits to form a second branch of the transmission line; and a plurality of capacitance circuits connected from spaced points on said inductance means to said circuit means which forms the second branch of the transmission line, each of said capacitance circuits including first, second, and third electrodes, said second electrode being between said first and third electrodes, dielectric material between said first and second electrodes and between said second and third electrodes, said dielectric material being of a type whose dielectric constant is a function of a voltage field therein, said second electrode being coupled to one of said branches and a pair of capacitors, said first capacitor coupling said first electrode to the other of said branches, said second capacitor coupling said third electrode to the other of said branches, voltage field generating means associated with each respective capacitance circuit and having first and second terminals of opposite polarity, first impedance means between said first terminal and said first electrode, second impedance means between said second terminal and said third electrode, whereby to vary the capacitance of each of said capacitance circuits, first adjustable means arranged to regulate the intensity of the voltage field in said dielectric material, magnetizable ferromagnetic core means positioned at least partially within said inductance means, control winding means arranged to produce D.C. magnetic control flux in said core means, and second adjustable means arranged to regulate the intensity of said flux in said core means, thereby to vary the delay characteristics and also to control the impedance of said line.

References Cited in the file of this patent

UNITED STATES PATENTS

| | | |
|---|---|---|
| 2,024,234 | Kunze | Dec. 17, 1935 |
| 2,226,728 | Lalande | Dec. 31, 1940 |
| 2,306,555 | Mueller | Dec. 29, 1942 |
| 2,470,893 | Hepp | May 24, 1949 |
| 2,495,740 | Labin et al. | Jan. 31, 1950 |
| 2,504,178 | Burnham et al. | Apr. 18, 1950 |
| 2,527,608 | Willoughby | Oct. 31, 1950 |
| 2,565,231 | Hepp | Aug. 21, 1951 |
| 2,569,309 | Hepp | Sept. 25, 1951 |